May 10, 1932. C. W. McKINLEY 1,857,651
OIL FILTERING SYSTEM
Filed March 28, 1928
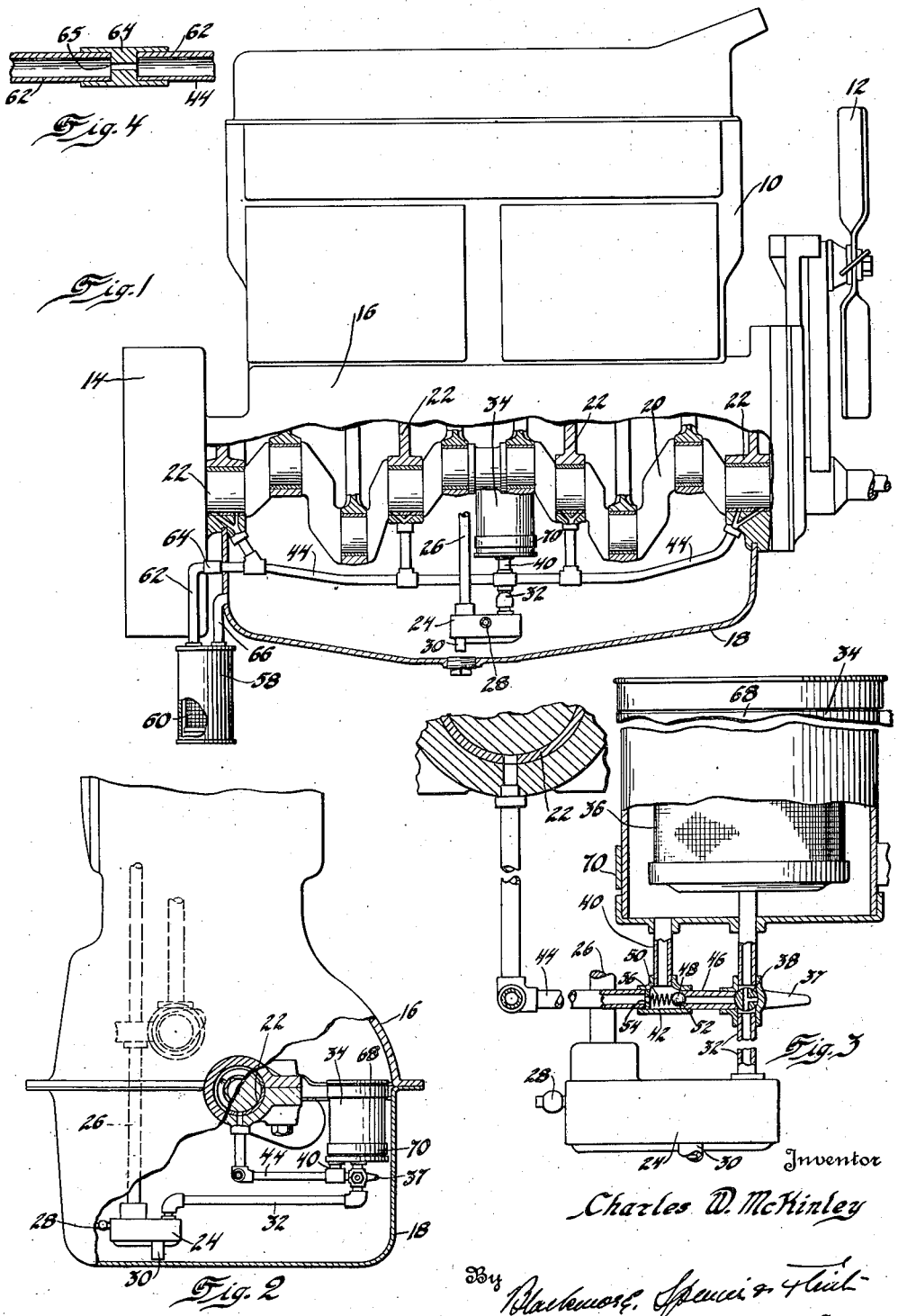
Inventor
Charles W. McKinley Patented May 10, 1932

1,857,651

UNITED STATES PATENT OFFICE

CHARLES W. McKINLEY, OF FLINT, MICHIGAN, ASSIGNOR TO A C SPARK PLUG COMPANY, OF FLINT, MICHIGAN, A COMPANY OF MICHIGAN

OIL FILTERING SYSTEM

Application filed March 28, 1928. Serial No. 265,261.

My invention relates to a system of oil filtering and has particular reference to a type of filtering system applied to internal combustion engines of automotive vehicles.

The conventional oiling system consists of a force feed pump usually placed in the oil pan below the crankcase, which forces the oil to the bearing parts and to a filter placed at a convenient point in the system. The leads to the bearings and filter are so arranged or restricted so that the oil flow is divided, a portion going to the filter, while the remainder is delivered to the bearings. Suitable by-passes and check valves are arranged in the system whereby if there be an excess of oil delivered by the pump or if the filter should become clogged, it will not prevent the oil from being forced to the bearings, or damage the system.

When the engine is new, there is usually present grinding compounds, chips, dirt or grit which are very likely to be carried into the oil stream. If these impurities are forced into the single conventional filter, it will result in a rapid clogging thereof and a necessary early replacement, or if they reach the bearings they will produce a deleterious effect on the smooth working of the bearing parts. These harmful impurities are only present for perhaps the first five hundred to one thousand miles the automobile is run, after which time the oil will assume the normal or usual state, due to the impurities having been caught in the filter.

With a view to avoiding premature clogging of the usual filter and to maintain an efficient functioning of the filtering system, it is proposed to catch this grinding compound, chips, grit, etc., and accordingly use is made of a second filter through which all of the oil is forced to pass during the first five hundred to one thousand miles. After this period this second filter may either be taken out and thrown away; or by means of a suitable arrangement of valves, all of the oil may be by-passed from the second filter to the bearings and the usual filter, and the second filter allowed to remain as it has no further function and its presence does not interfere with the system. The filters used are of the fabric type and preferably of the kind shown in McKinley 1,651,400.

In the arrangement disclosed on the accompanying drawings, the oil pump has a lead to the first filter and in this lead there is preferably positioned a three-way valve. The filter has an outlet to a pipe which conducts the oil to the bearing parts of the engine and to the usual filter. The inlet and outlet pipes of the filter are interconnected, and in this connection there is placed a spring pressed ball check valve which serves as a means for by-passing the oil, either in case the filter becomes clogged, or if the three-way valve be so turned so as to prevent any of the oil from going to the filter.

In the system and beyond the second filter there is placed the usual oil filter. The lead to this filter has a restriction to control the flow of oil thereto, and from the filter the oil is led back to the oil pan.

The invention is disclosed on the accompanying drawings in which:

Figure 1 is a side view of an internal combustion engine with parts broken away and shown in section to illustrate the application of the invention thereto.

Figure 2 is an end view of the engine with parts broken away and shown in section to disclose the invention.

Figure 3 is an enlarged detailed view with parts shown in section, the view being taken substantially through the filter 34 and pipe 32 of Figure 1.

Figure 4 is a detailed sectional view of the restriction in the lead to the second filter.

Referring to Figure 1, 10 indicates an internal combustion engine as a whole having a fan 12, a flywheel housing 14, crankcase 16, and oil pan 18. The crankshaft is shown at 20 positioned in bearings 22, while 24 indicates the usual oil pump driven from a shaft 26 in any suitable way. The pump 24 has the usual by-pass valve 28 and a pipe 30 leading to the bottom of the oil pan 18. These parts are conventional and form no part of the present invention, except insofar as they relate to the combination.

The pump 24 has a lead or pipe 32 passing to a filter 34 having a filtering material 36 which is preferably though not necessarily of a relatively coarse mesh. In the lead 32, operated by a handle 37, is a three-way valve 38, the function of which will later be described.

From the filter 34 an outlet pipe 40 leads to a connection 42 which has joined thereon a pipe or conduit 44, leading to the bearings 22 of the engine, and to the usual filter 58.

Connecting the outlet pipe 32 and the connection 42 is a pipe 46, and positioned in the connection 42 to control the oil flow through pipe 46 is a ball check valve 48 held by means of a spring 50 against a seat 52 in the pipe 46. The opposite end of the spring abuts against a disc 54 having a central opening 56, which may or may not be used as a restriction in the system, depending on its diameter.

The three-way valve 38 is preferably positioned at the junction of pipe 46 with the inlet pipe 32, and has a two-fold function; first, to permit all of the oil to pass to the filter in the position shown in Figure 3, or; second, to shut off the flow to the filter entirely, (when turned clockwise through an angle of ninety degrees) and force all of the oil from the pump to flow into the pipe 46, past the ball check valve 48, into the pipe 44, and on to the filter and bearings of the engine.

When the engine is new, it has been found that there is present at times a quantity of grinding compound, chips, grit or dirt which are considerably larger or coarser than the impurities customarily found in the oiling system of an internal combustion engine. These coarser or larger impurities will quickly stop up the ordinary filter and interfere with the efficient functioning of the system, due to the clogging of the oil filter. It has been found that these unusual or larger impurities are present only during the first five hundred to one thousand miles an automobile is driven, after which period of driving they have been caught in the filter and removed from the lubricating system. In order to catch these particles before they reach the usual filter and the bearings and to immediately remove them from the lubricating system, I employ a second or additional filtering element and cause all of the oil to pass therethrough before it reaches the bearings. After the engine has run for its first five hundred to one thousand miles, this second filter may be shunted out or entirely removed and thrown away, its function having been accomplished.

In the piping 44 of the lubricating system there is placed a second filter 58 which is of the usual kind and the filtering material 60 of which is of a mesh relatively smaller when compared with the mesh of the filtering material 36 of the first filter 34. This filter 58 has the lead or pipe 62 coming from the pipe system 44 and in this lead there is placed at any suitable point as at 64, a restriction 65 which will limit the amount of oil which flows to the filter 58 and prevent robbing the bearings of oil. The usual outlet pipe 66 leads from the filter 58 back to the oil pan 18.

The operation of the lubricating system is as follows: The oil from the pump 24 will be forced through the pipe 32 past the three-way valve 38 into the filter 34. In the filter 34 the oil will pass through the relative-course mesh filter material 36 and flow from the outlet 40 into the pipe 44 and on to the bearings 22 and filter 58. After a given period of time, or after the automobile has run five hundred to one thousand miles, the three-way valve 38 may be turned so as to prevent any oil from going to the filter 34 and force all of the oil to pass through the pipe 46 past the ball check valve 48 and then into the pipe 44. If desired, the valve 38 may be omitted and the oil allowed to take its natural course up through the pipe 32 and into the filter 34. When the back pressure of the filter exceeds the tension of the spring 50, the oil will automatically pass to the pipe 46 and unseat the one-way valve 48 and flow to the pipe 44. The spring 50 of the ball check valve 48 has only a slight tension which is considerably less than the spring of the by-pass valve 28 for the obvious purpose of allowing the valve 48 to unseat before the valve 28, and not to reduce the oil pressure to the bearings any more than necessary.

As the oil reaches the pipe 44 with the coarser impurities removed, it will divide, a portion thereof flowing to the bearings 22, while the remaining portion will flow past the restriction 64 and on to the filter 58 where it will be purified and returned to the oil pan 18 through the pipe 66.

While, I have described the filter 34 as having a filtering material of a mesh relatively coarser than the conventional filter shown at 58, it is within the scope of the invention to have both filters of the usual mesh material or equivalent to the filter 58.

The filter 58 is shown in Figure 1, as positioned below the oil pan 18, however, this showing is only for purposes of illustration as the filter may be placed at any suitable point.

The filter 34 may be secured at any desired place but is preferably positioned within the oil pan 18, and is held therein by means of brackets 68 and 70 as shown in Figure 2.

I claim:

1. In combination with an engine having a force feed lubricating system, a filter in said system, a pipe leading from the force feed means to the filter, a valve in said pipe for allowing all or none of the lubricant to pass through the filter, an outlet pipe for the filter, a pipe leading from the valve to the outlet pipe, a spring pressed valve in said last named pipe to prevent the back flow of oil through the filter, a pipe connected to the outlet to conduct the lubricant to the bearing parts of the engine, a second filter in the system beyond said first named filter, means to restrict the flow of oil to said second named filter, and means for returning the oil from said second named filter to the system.

2. In combination with an engine having a force feed lubricating system, means to force the lubricant to the working parts of said engine, pressure relief means interrelated with said force means, a piping system leading from the force means, a first filter in said system between the force means and working parts, a bypass to allow the lubricant to flow through the system without passing thru the first filter, a second filter in said system, and means to return the lubricant from said second filter to the pump.

3. In combination with an engine having a force feed lubricating system, means to force the lubricant to the working parts of said engine, a piping system leading from said force means, a first filter connected in said piping system, a bypass to allow the lubricant to flow around the filter, a pressure relief valve to allow for the outflow of lubricant when the pressure reaches a predetermined amount, a second filter in said system beyond said first filter, and means to return the lubricant from said second filter to the pump.

4. In combination with an engine having a forced feed lubricating system, an impurity removing device in said system, means for conducting the lubricant to the device, means for conducting the lubricant from the device to the bearing parts of the engine, and a second impurity removing device in said system receiving a portion only of the lubricant passed toward said bearing parts from said first mentioned device.

5. In combination with an engine having a forced feed lubricating system, an impurity removing device receiving all of the oil passed through said system, means for conducting the lubricant to the device, means for conducting the lubricant from the device to the bearing parts of the engine, and a second impurity removing device in said system receiving a portion only of the lubricant passed toward said bearing parts from said first mentioned device.

6. In combination with an engine having a force feed lubricating system, a filter in the system, a flow control means comprising a spring pressed ball valve in the system, said means preventing the return of lubricant from the filter to the pump but allowing unfiltered oil to flow to the system, means for conducting the lubricant from the filter to the bearing parts of the engine, and a second impurity removing device in said system connected in said last-named means.

7. In combination with an engine having a force feed lubricating system, a filter in the system, a flow control means in the system, said means preventing the return of lubricant from the filter to the pump but allowing unfiltered oil to flow into the system, a valve between said force feed means and said first named filter, means for conducting the lubricant from the filter to the bearing parts of the engine, and a second filter in said system connected in said last-named means.

8. In combination with an engine having a force feed lubricating system, a filter in the system, a flow control means in the system, said means preventing the return of lubricant from the filter to the pump but allowing unfiltered oil to flow into the system, a valve between said force feed means and said first named filter, said valve permitting all or none of the oil to pass through said first named filter, means for conducting the lubricant from the filter to the bearing parts of the engine, and a second filter in said system connected in said last-named means.

9. In combination with an engine having a force feed lubricating system, a filter in said system, an inlet lead from the force feed means to the filter, flow controlling means in said lead, an outlet pipe from said filter, a conduit connecting said lead and pipe, means in said conduit to prevent the back flow of oil, means for delivering the lubricant from the pipe to the bearing parts of the engine, and a second filter in said system receiving oil from said first filter.

10. In combination with an engine having a force feed lubricating system, a filter in said system, an inlet lead from the force feed means to the filter, flow controlling means in said lead, an outlet pipe from said filter, a conduit connecting said lead and pipe, means in said conduit to prevent the back flow of oil, means for delivering the lubricant from the pipe to the bearing parts of the engine, a second filter in said system, and a flow control means in said system between said bearing parts and second filter.

11. In combination with an engine having a force feed lubricating system, a filter in said system, an inlet lead from the force feed means to the filter, flow controlling means in said lead, an outlet pipe from said filter, a conduit connecting said lead and pipe, means in said conduit to prevent the back flow of oil, means for delivering the lubricant from the pipe to the bearing parts of the engine, a second filter in said system, and a restriction in said system between said bearing parts and said second filter.

12. In combination with an engine having a force feed lubricating system, a filter in said system adapted to receive all of the lubricant, an inlet lead from the force feed means to the filter, controlling means in said lead, an outlet pipe from said filter, a conduit connecting said lead and pipe, a control means in said conduit, means for delivering the lubricant from the pipe to the bearing parts of the engine, and a second filter in said system adapted to receive a portion only of the lubricant.

In testimony whereof I affix my signature.

CHARLES W. McKINLEY.